(12) United States Patent
Johansson et al.

(10) Patent No.: US 11,091,877 B2
(45) Date of Patent: Aug. 17, 2021

(54) CNF CELLULAR SOLID MATERIAL

(71) Applicant: Cellutech AB, Stockholm (SE)

(72) Inventors: Erik Johansson, Stockholm (SE); Nicholas Tchang Cervin, Stockholm (SE); Korneliya Gordeyeva, Stockholm (SE); Lennart Bergstrom, Stockholm (SE); Lars-Erik Wagberg, Stockholm (SE)

(73) Assignee: Cellutech AB, Stockholm (SE)

( * ) Notice: Subject to any disclaimer, the term of this patent is extended or adjusted under 35 U.S.C. 154(b) by 128 days.

(21) Appl. No.: 15/523,045

(22) PCT Filed: Apr. 21, 2015

(86) PCT No.: PCT/SE2015/050454
§ 371 (c)(1),
(2) Date: Apr. 28, 2017

(87) PCT Pub. No.: WO2016/068771
PCT Pub. Date: May 6, 2016

(65) Prior Publication Data
US 2017/0314200 A1    Nov. 2, 2017

(30) Foreign Application Priority Data
Oct. 30, 2014   (SE) .................................. 1430153-5

(51) Int. Cl.
*D21H 11/18*   (2006.01)
*D21H 27/10*   (2006.01)
(Continued)

(52) U.S. Cl.
CPC .............. *D21H 11/18* (2013.01); *B01J 20/24* (2013.01); *B01J 20/28045* (2013.01);
(Continued)

(58) Field of Classification Search
CPC .................. B01J 20/24; B01J 20/28045; B01J 20/28054; D21H 11/18; D21H 11/20;
(Continued)

(56) References Cited

U.S. PATENT DOCUMENTS 10,640,925 B2   5/2020   Mallya
2010/0291822 A1   11/2010   Netravali et al.
(Continued)

FOREIGN PATENT DOCUMENTS

CN   103739868   4/2014
CN   106521706   3/2017
(Continued)

OTHER PUBLICATIONS

Cervin et al. Lightweight and Strong Cellulose Materials Made from Aqueous Foams Stabilized by Nanofibrillated Cellulose; *Biomacromalecules*, 2013 14, 503-311.
(Continued)

*Primary Examiner* — Patricia L. Hailey
(74) *Attorney, Agent, or Firm* — Fish & Richardson P.C.

(57) ABSTRACT

The present invention relates to cellular solid materials comprising cellulose nanofibers (CNF) and an anionic or non-ionic surfactant, a method for preparation of such materials, as well as their use.

33 Claims, 4 Drawing Sheets

(51) Int. Cl.
| | |
|---|---|
| D21H 11/20 | (2006.01) |
| C08L 1/04 | (2006.01) |
| C08B 15/02 | (2006.01) |
| C08J 9/28 | (2006.01) |
| B01J 20/24 | (2006.01) |
| B01J 20/28 | (2006.01) |
| B82Y 30/00 | (2011.01) |
| C08J 9/00 | (2006.01) |

(52) U.S. Cl.
CPC .............. *C08B 15/02* (2013.01); *C08J 9/28* (2013.01); *C08L 1/04* (2013.01); *D21H 11/20* (2013.01); *D21H 27/10* (2013.01); *B82Y 30/00* (2013.01); *C08J 9/0052* (2013.01); *C08J 9/0061* (2013.01); *C08J 2201/048* (2013.01); *C08J 2201/05* (2013.01); *C08J 2301/02* (2013.01); *C08J 2429/04* (2013.01); *C08J 2471/02* (2013.01)

(58) Field of Classification Search
CPC ........ D21H 27/10; B82Y 30/00; C08B 15/02; C08L 1/04; C08J 9/28; C08J 9/0052; C08J 9/0061; C08J 2201/08; C08J 2201/05; C08J 2301/02; C08J 2429/04; C08J 2471/02
USPC .......................... 428/304.4, 311.71; 106/122
See application file for complete search history.

(56) References Cited

U.S. PATENT DOCUMENTS

| | | | | |
|---|---|---|---|---|
| 2012/0283363 | A1* | 11/2012 | Kumamoto | C08J 5/045 524/35 |
| 2013/0017394 | A1* | 1/2013 | Hua | D21D 1/20 241/28 |
| 2013/0171439 | A1* | 7/2013 | Shoseyov | B82Y 30/00 428/220 |
| 2014/0079931 | A1* | 3/2014 | Berglund | B82Y 30/00 428/219 |
| 2014/0228460 | A1* | 8/2014 | Deleuze | C08J 9/28 521/114 |
| 2014/0256925 | A1* | 9/2014 | Catchmark | C08L 5/08 536/20 |
| 2015/0114581 | A1 | 4/2015 | Kinnunen | |
| 2017/0226407 | A1* | 8/2017 | Homma | C08L 5/00 |
| 2017/0313838 | A1 | 11/2017 | Johansson et al. | |
| 2020/0332029 | A1 | 10/2020 | Benselfelt et al. | |

FOREIGN PATENT DOCUMENTS

| | | | |
|---|---|---|---|
| SE | 2014011112 | * | 1/2014 |
| WO | WO 2007/068127 A1 | | 6/2007 |
| WO | WO 2010/015726 | | 2/2010 |
| WO | WO 2010/071584 | | 6/2010 |
| WO | WO 2010/073678 | | 6/2012 |
| WO | WO 2013/160553 | | 10/2013 |
| WO | WO 2013/183415 | | 12/2013 |
| WO | WO 2014/011112 | | 1/2014 |
| WO | WO 2014/068196 | | 5/2014 |
| WO | WO 2015/114630 | | 8/2015 |
| WO | WO/2016/068771 | | 5/2016 |
| WO | WO 2016/068787 | | 5/2016 |
| WO | WO 2016/128620 | | 8/2016 |

OTHER PUBLICATIONS

Cervin et al.. "Ultra porous nanocellulose aeropels as separation medium for mixtures of oil/water liquids", Cellulose, 2012, vol. 19. pp. 401-41 O; whole document.
Cervin, Porous Cellulose Materials from Nano Fibrillated Cellulose: Royal Institute of Technology, 2012.
Gonzenbach et al., "Stabilization of Foams with Inorganic Colloidal Particles" Langmuir 2006. 22: 10983-10988.
Gonzenbach et al., "Ultrastable Particle-Stabilized Foams" Chem. Int. Ed. 2006,45, 3526-3530.
Griffin, "Calculation of HLB Values of Non-Ionic Surfactants," Journal of the Society of Cosmetic Chemists 1954 5 (4): 249-56.
Griffin, "Classification of Surface-Active Agents by HLB" Journal of the Society of Cosmetic Chemists 1949 1 (5): 311-26.
Henriksson et al.. "An Environmentally Friendly Method for Enzyme-Assisted Preparation of Microfibrillated Cellulose (MFC) nanofibers" European Polymer Journal 2007, 43(8) 3434-3441.
International Report on Patentability in Application No. PCT/SE2015/050454, dated Nov. 12, 2015, 7 pages.
International Search Report and Written Opinion in International Application No. PCT/SE2015/050454, dated Feb. 17, 2016, 8 pages.
International Search Report and Written Opinion in International Application No. PCT/SE2015/050454, dated Nov. 12, 2015, 8 pages.
Katz et al., "The determination of strong and weak acidic groups in sulfite pulps" Svensk Papperstidning 1984 pp. 48-53.
Kinnunen et al. Thin coatings for paper by foam coating. In PaperCon 2013, Apr. 27-May 1, Atlanta, GA: TAPPI.
Paakko et al. 'Long and entangled native cellulose I nanofibers allow flexible aerogels and hierachically porous templates for functionalities', Soft Matter, 2008, vol. 4, pp. 2492-2499, ISSN 1744-683X, whole document.
Saito et al.,"Cellulose Nanofibers Prepared by TEMPO-Mediated Oxidation of Native Cellulose" Biomacromolecules 2007, 8(8) 2485-2491.
Studart et al., "Processing Routes to Macroporous Ceramics: A Review" J. Am. Ceram. Soc.; 2006. 89(6)1771-1789.
Wagberg et al., "Charge determination of porous substrates by polyelectrolyte adsorption," Nord. Pulp Pap. Res, J. 1989, 2, 71-76.
Wagberg et al., "The Build-Up of Polyelectrolyte Multilayers of Microfibrillated Cellulose and Cationic Polyelectrolytes" 2008, 24 784-795.
Al-Qararah, "Aqueous foam as the carrier phase in the deposition of fibre networks," Department of Physics, University of Jyvaskyla, Research Report No. Jul. 2015, Nov. 2015, 74 pages.
Grasdalen et al. "AP.M.R. Study of the composition and sequence of uronate residues in alignates," Carbohydr. Res. 1979, 68:23-31.
Haug et al., "A study of the constitution of alginic acid by partial acid hydrolysis," Acta Chem. Scand. 1966, 20:183-190.
International Search Report and Written Opinion in Appln. No. PCT/SE2018/051060, dated Dec. 7, 2018, 11 pages.
Khalil et al., "Seaweed based sustainable films and composites for food and pharmaceutical applications: a review," Renewable and Sustainable Energy Reviews, 2017, 77:353-362.
Kinnunen et al., "Benefits of foam forming technology and its applicability in high MFC addition structures," Advances in Pulp and Paper Research, 2013, 837-850.
Kinnunen, "Foam as a carrier phase—a multipurpose technology for industrial applications," Aalto University, Doctoral Dissertations, 2017, 191 pages.
Larsson et al., "Improved barrier films of cross-linked cellulose nanofibrils: a microscopy study," Green Materials, 2014, 2:163-168.
Lehmonen et al., "Dewatering of foam-laid and water laid-structures and the formed web properties," Cellulose, 2020, 27:1127-1146.
Lin et al., "Tempo-oxidized nanocellulose participating as crosslinking aid for alginate-based sponges," ACS Applied Materials & Interfaces, 2012, 4(9):4948-4959.
Markstedt et al., "3D Bioprinting Human Chondrocytes with Nanocellulose-Alginate Bioink for Cartilage Tissue Engineering Applications," Biomacromolecules 2015, 16:1489-1496.
Radvan et al., "The formation of wet-laid webs by a foaming process," Tappi, 1972, 55(5):748-751.
Shimizu et al., "Water-resistant and high oxygen-barrier nanocellulose films with interfibrillar cross-linkages formed through multivalent metal ions" J. Membr. Sci. 2016, 500:1-7.
Sirvio et al., "Biocomposite cellulose-alginate films: promising packaging materials," Food Chemistry 2014, 151:343-351.

(56) References Cited

OTHER PUBLICATIONS

Smith et al., "The structure and properties of paper formed by a foaming process," Tappi, 1974, 57(1):107-111.
Solbrzano et al., "Cellular Materials," Structural Materials and Processes in Transportation, 2013, 1:371.
Steginsky et al., "Structural determination of alginic acid and the effects of calcium binding as determined by high-field n.m.r.," Carbohydr. Res. 1992, 225:11-26.
Van de Velde, F. et al., "High resolution NMR of Carrageenans," A., Ed.; Springer Netherlands: Dordrecht, 2006, pp. 1605-1610.
Vapaavuori et al. "Long and entangled native cellulose 1 nanofibers allow flexible aerogels and hierarchically porous templates for functionalities" Soft Matter, 2008, 4:2492-2499.
Weaire and Hutzler, "The Physics of Foams," Oxford University Press, 1999, 5 pages.

\* cited by examiner

CNF CELLULAR SOLID MATERIAL

CROSS-REFERENCE TO RELATED APPLICATIONS

This application is a National Stage application under 35 U.S.C. § 371 of International Application No. PCT/SE2015/050454, filed Apr. 21, 2015, which claims priority to SE1430153-5, filed Oct. 30, 2014. The disclosures of the prior applications are incorporated by reference in their entirety.

FIELD OF THE INVENTION

The present invention relates to cellular solid materials comprising cellulose nanofibers (CNF) and an anionic or non-ionic surfactant, a method for preparation of such materials, as well as their use.

TECHNICAL BACKGROUND

In our everyday life, macroporous and microporous materials mostly made of petroleum based polymers are used in various forms and compositions. Examples of these are insulation in buildings and airplanes, and polymeric foams for packaging. Foams for this type of use have to be stable, light and easy to manufacture.

Due to the increased awareness of the need to use renewable materials, it is highly motivated to replace petroleum-based polymers with polymers from renewable resources. Cellulose has a special potential, as the most abundant renewable natural polymers on earth, with its crystalline structure, and the availability of methods for preparing large volumes on an industrial scale. Cellulose chains with β-(1-4)-D-glucopyranose repeating units are packed into long nanofibrils in the plant, with cross-sectional dimension of 5-30 nm depending on the plant source. The parallel organization of the cellulose chains, held together by hydrogen bonds and organized in sheets, gives a crystal structure with a Young's modulus of approximately 130 GPa.

Considering their excellent mechanical properties, these nanofibrils are highly interesting as potential building-blocks for new nanomaterials and also as replacement material for petroleum based structures. Cellulose nanofibrils (CNF) can be liberated from wood pulp by means of mechanical disintegration, often preceded by an enzymatic (Henriksson et al., *European Polymer Journal.*, 2007, 43(8) 3434-3441) or chemical pretreatment (Saito et al., *Biomacromolecules*, 2007, 8(8) 2485-2491; Wågberg et al., *Langmuir*, 2008, 24 784-795) in order to facilitate the liberation of the fibrils and to decrease the energy demand. The terminology in the literature is not unambiguous, the nanofibrils have been called for example microfibrillated cellulose (MFC), nanofibrillated cellulose (NFC) and, as used herein, cellulose nanofibrils (CNF).

For more than a century, colloidal particles have been used to stabilize high energy interfaces in so-called Pickering emulsions. But it is only recently that this concept has been exploited for the preparation of ultra-stable wet foams and the preservation of these structures in a dry state to maintain porous materials. When particles are partially lyophobic or hydrophobic, they attach to the gas-liquid interface. It occurs because it is energetically favorable for particles to attach at the gas-liquid interface and replace part of the high energy solid-liquid area by a low energy solid-gas area. Preferably the particles should attach to the interface with a contact angle of approximately 90°. This is ultimately determined by the balance between the gas-liquid, gas-solid and solid-liquid interfacial tensions. In contrast to surfactants, particles tend to adsorb strongly at interfaces due to the high adsorption energy. This is the reason why particle-stabilized foams exhibits an outstanding stability compared to surfactant-based systems. Coalescence is hindered by the steric repulsion from the attached particles and additionally, the particles form a layer at the interface that strongly resists the shrinkage and expansion of bubbles, minimizing Ostwald ripening and creating long lasting stable foams.

WO2007/068127A1 discloses methods on how to prepare particle-stabilized foams with initially lyophilic particles that are in-situ lyophobized through the adsorption of amphiphilic molecules on the particle surface. These foams can be dried with preserved porous structure (Studart et al., J. Am. Ceram. Soc., 2006, 89(6) 1771-1789; Gonzenbach et al. Angew. Chem. Int. Ed. 2006, 45, 3526-3530; WO2007/068127A1). Foams prepared with particles and non-adsorbed amphiphiles, regular non-ionic surfactants or surfactants with the same sign of charge as the particles, were unstable and collapsed within seconds to minutes (Gonzenbach et al., Langmuir 2006, 22, 10983-10988).

WO2014/011112A1 discloses the preparation of hydrophobized wet foams from anionic CNF lyophobized by adsorption of cationic hydrophobic amines, e.g. n-octylamine. The foams were dried with maintained porous structure (Cervin, *Porous Cellulose Materials from Nano Fibrillated Cellulose*, Royal Institute of Technology, 2012; Cervin et al. *Lightweight and Strong Cellulose Materials Made from Aqueous Foams Stabilized by Nanofibrillated Cellulose*, Biomacromolecules, 2013, 14, 503-311; WO2014/011112A1).

Foam forming of a fibrous web containing CNF and pulp (WO 2013/160553) and thin foam coating of CNF onto fibrous webs have been made at the Technical Research Centre of Finland (VTT) (Kinnunen et al. Thin coatings for paper by foam coating, In PaperCon 2013, 27 Apr.-1 May, Atlanta, Ga.: TAPPI).

Most methods for producing solid cellular materials comprising CNF involve supercritical drying or freeze-drying of wet CNF gels. However, it is difficult to prepare large pieces of foam without cracks using such methods.

CNFs are highly interesting for preparing highly porous renewable materials and a lot of work has been done in this area. However, there is a need for improved methods where wet CNF foams can be dried with maintained porous structure in the dry state.

SUMMARY OF THE INVENTION

The objective of this invention is to provide cellular solid materials from renewable materials. It is further an object of the invention to provide a renewable material that has a high porosity, a good pore size distribution and good mechanical properties.

The present invention relates to a cellular solid material comprising cellulose nanofibers (CNF) and a surfactant, wherein:
  a) the surfactant is anionic or non-ionic;
  b) the material has a density of less than 500 kg/m$^3$; and
  c) at least 50% of the cells of the material have a diameter of at least 10 μm.

The present invention further relates to a method for producing a cellular solid material comprising:
  a) providing a dispersion of cellulose nanofibers (CNF) in an aqueous solvent, b) adding an anionic or non-ionic surfactant to the dispersion in (a) to obtain a mixture,
c) preparing a foam of the mixture obtained in b) wherein the density of the wet foam is at most 98% of the mixture prepared in step (b), and
d) drying the foam obtained in c) to obtain a cellular solid material.

The present invention also relates to a cellular solid material obtainable by the method according to the present invention, use of a cellular solid material comprising cellulose nanofibers (CNF) and an anionic or a non-ionic surfactant for insulation, packaging or absorption, as well as products comprising a cellular solid material comprising cellulose nanofibers (CNF) and an anionic or non-ionic surfactant.

The cellular solid material according to the present invention has a preserved cellular structure and demonstrate good mechanical properties.

DETAILED DESCRIPTION OF THE INVENTION

All words and abbreviations used in the present application shall be construed as having the meaning usually given to them in the relevant art, unless otherwise indicated. For clarity, some terms are however specifically defined below.

Throughout the present description the term "foam" is used for a gas dispersed in a solid or liquid medium, wherein bubbles of gas are separated from each other by thin films of the liquid or solid medium to form cells of the gas.

Figure 5:
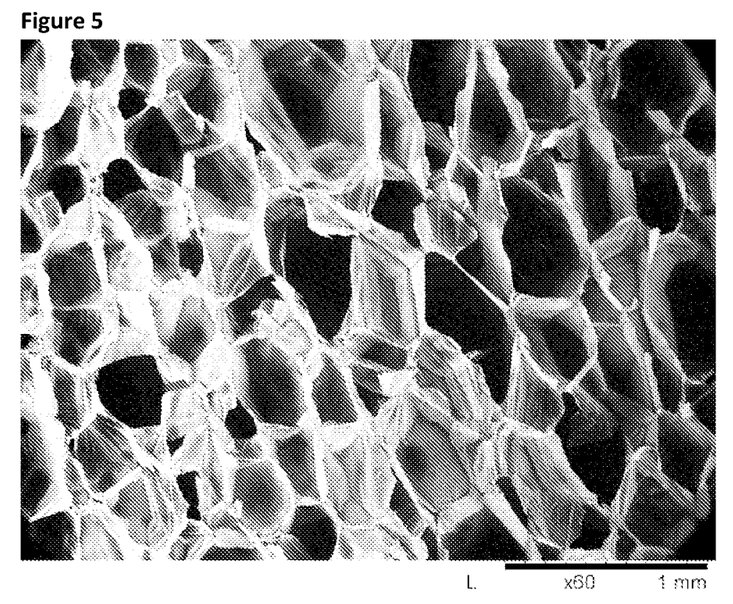
FIG. 5 shows an SEM image of cellular solid material prepared from 30 g of TEMPO-oxidized anionic CNF (0.6 wt %) and 0.1 ml of anionic SDS (25 g/L).
Figure 6:
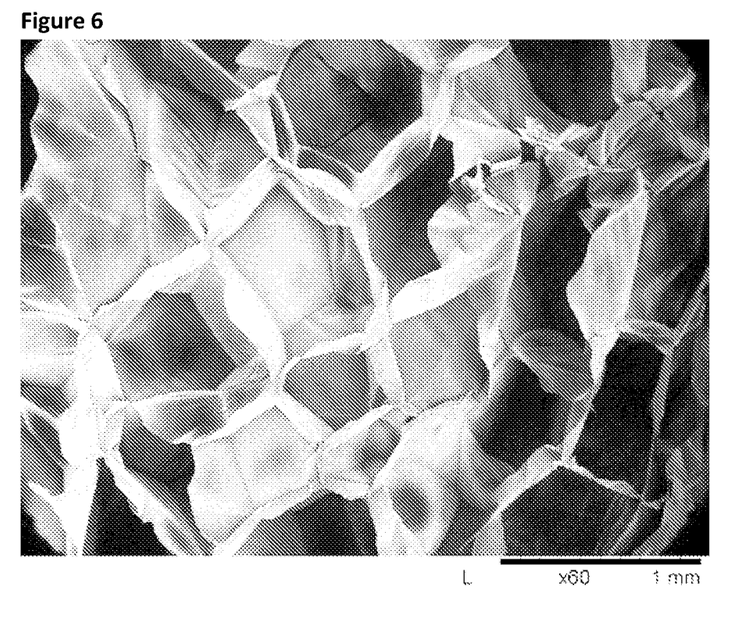
FIG. 6 shows an SEM image of cellular solid material prepared from 300 g of TEMPO-oxidized anionic CNF (0.5 wt %) and 1.0 ml of anionic SDS (25 g/L).

Throughout the present description the term "cellular solid material" is used for solid materials having an assembly of cells with solid edges or faces, packed together. FIGS. 5 and 6 show typical cellular solid materials.

In the context of the present application, the term "diameter" refers to the largest internal dimension of a cell.

The term "CNF" is used herein for cellulose nanofibers liberated from wood pulp or from other sources, for example selected from the group consisting of plants, tunicate, and bacteria by means of mechanical disintegration, often preceded by a chemical pretreatment, such as by oxidation with 2,2,6,6-tetramethylpiperidine-1-oxyl (TEMPO) giving TEMPO-oxidized CNF, or by carboxymethylation giving carboxymethylated CNF; or by enzyme-treatment, such as by endoglucanases, giving enzymatic CNF. CNF typically have a smallest dimension in the range 2-100 nm, while the length can be several micrometers, such as up to 10 μm, and therefore the aspect ratio of CNF (ratio of length to diameter) is very large. An advantage of using CNF from wood-pulp is the abundance of wood-based cellulose and the existing, efficient infrastructure for the handling and processing of pulp and fibers.

It should be noted that embodiments and/or features and/or advantages described in the context of one of the aspects and/or embodiments of the present invention may also apply mutatis mutandis to all the other aspects and/or embodiments of the invention.

In a first aspect, the present invention relates to a cellular solid material comprising cellulose nanofibers (CNF) and a surfactant, wherein:
a) the surfactant is anionic or non-ionic;
b) the material has a density of less than 500 kg/m$^3$; and
c) at least 50% of the cells of the material have a diameter of at least 10 μm.

In a second aspect the present invention relates to a method for producing cellular solid material comprising:
a) providing a dispersion of cellulose nanofibers (CNF) in an aqueous solvent,
b) adding an anionic or a non-ionic surfactant to the dispersion in (a) to obtain a mixture,
c) preparing a wet foam of the mixture obtained in b) wherein the wet foam has a density less than 98% of the mixture prepared in step (b), and
d) drying the wet foam obtained in c) to obtain a cellular solid material.

In a third aspect the present invention comprises a cellular solid material obtainable by the method according to the second aspect of the invention.

An advantage with the cellular solid material according to the present invention is that it is made of a renewable material. The solid cellular material according to the present invention may comprise at least 20 wt %, at least 30 wt %, at least 40 wt %, at least 50 wt %, at least 60 wt % CNF, calculated on the total weight of the cellular solid material. The solid cellular material according to the present invention may comprise up to and including 99.8 wt % CNF, up to and including 99.5 wt % CNF, up to and including 99 wt %, up to and including 98 wt %, up to and including 97 wt %, up to and including 96 wt %, up to and including 95 wt %, up to and including 90 wt %, up to and including 80 wt %, or up to and including 70 wt % CNF, calculated on the total weight of the cellular solid material.

The properties of the cellular solid material might be tailored by varying the CNF concentration; CNF quality, such as pretreatment, charge, and homogenization of the nanofibers; choice and amount of surfactant; additives; mixing energy; and amount of gas introduced in the foaming step, used in the method of the present invention.

The cellular solid material according to the present invention has a density of less than 500 kg/m$^3$. In preferred embodiments, the cellular solid material according to the present invention may have a density of less than 300 kg/m$^3$, less than 200 kg/m$^3$, less than 100 kg/m$^3$, or less than 50 kg/m$^3$. The density of the cellulose solid material may be at least 0.5 kg/m$^3$, or at least 1.0 kg/m$^3$.

The viscosity of the CNF dispersion in step (a) of the method will be substantially increased with increased CNF concentration. This affects the amount of gas that can be introduced with a given foaming method and also the degree of stability of the wet foam.

In the method according to the second aspect of the present invention, the CNF concentration in the dispersion in step (a) may be at least 0.2 wt %, at least 0.3 wt %, at least 0.4 wt %, or at least 0.5 wt %, calculated on the total weight of said dispersion.

Dispersions of at least 1 wt % CNF, calculated on the total weight of the dispersion, may also be used in the method according to the present invention. Higher concentrations of CNF, such as of 1 wt % and higher, decrease the time needed to dry the foams. By varying the concentration of CNF the properties of the cellular solid materials may be tailored. Because of the substantial increase of the viscosity of CNF dispersions when the CNF concentration is increased, the upper limit for the concentration of CNF depends on the available foaming setup, e.g. the capacity of the mixer. Typically, the concentration of CNF in the dispersion in step (a) may be up to and including 30 wt %, or up to and including 25 wt % CNF, calculated on the total weight of said dispersion.

The aqueous solvent used for making the CNF dispersion in the method according to the present invention may be water, or a mixture of water and an organic solvent, such as ethanol. Such mixture of water and an organic solvent may have a water content of at least 80%, at least 85%, at least 90%, or at least 95%, calculated on the total weight of the aqueous solvent.

The CNF used in the cellular solid material and in the method for its manufacturing according to the present invention may be cellulose nanofibers selected from the group consisting of enzymatic CNF, TEMPO-CNF, and carboxymethylated CNF.

The cellulose nanofibers of the present invention may be anionic. The charge density of the anionic cellulose nanofibers will depend on the degree of modification obtained by the chemical pre-treatment of the cellulose prior to the mechanical disintegration to CNF. The anionic cellulose nanofibers (CNF) used in the present invention may have a charge density of from 0 to 2000 µeq/g, from 25 to 2000 µeq/g, from 200 to 2000 µeq/g, from 0 to 1500 µeq/g, from 25 to 1500 µeq/g, from 250 to 1500 µeq/g, from 500 to 1500 µeq/g, or from 750 to 1500 µeq/g calculated on the dry weight of the CNF. The charge density may be determined by conductometric titration, as described by Katz Set al., Svensk Papperstidning 1984, R87, or polyelectrolyte titration, as described by Wågberg L., et al. Nord. Pulp Pap. Res. J. 1989, 4, 71-76.

With the methods according to the present invention it is possible to form a cellular solid material comprising cellulose nanofibers (CNF) by foaming a dispersion of CNF and at least one anionic or non-ionic surfactant, without using cationic surfactants. Anionic and non-ionic surfactants have the benefit that most of these surfactants are nontoxic, having an LD50 comparable to sodium chloride. In a specific embodiment of the method according to the present invention, the surfactant may be selected only from anionic surfactants.

Different surfactants have different foaming properties and might influence the drying and the cellular solid material in different ways. Surfactants may be characterized by their hydrophilic-lipophilic balance (HLB). The HLB is determined by calculating values for the different regions of the molecule, as described by Griffin, *Classification of Surface-Active Agents by 'HLB'*, Journal of the Society of Cosmetic Chemists 1949 1 (5): 311-26; and Griffin, *Calculation of HLB Values of Non-Ionic Surfactants*, Journal of the Society of Cosmetic Chemists 1954 5 (4): 249-56.

Griffin's method for determining the HLB-value of non-ionic surfactants as described in 1954 is used herein for determination of the HLB-values. Calculations of the HLB of nonionic surfactants by Griffin's are made according to the following Equation [1]

$$HLB=20*M_h/M \qquad [1]$$

where $M_h$ is the molecular mass of the hydrophilic portion of the molecule, and M is the molecular mass of the whole molecule, giving a result on a scale of 0 to 20 for non-ionic surfactants. The lower the HLB value the more lipophilic or oil soluble surfactant, while the higher the HLB value the more water soluble or hydrophilic surfactant. Non-ionic surfactants with an HLB value of 1.5 to 3 are normally used as anti-foaming agents (Griffin, 1949). Different surfactants may be mixed to obtain a desired HLB-value.

In certain embodiments, the cellular solid material according to the present invention comprises one or more non-ionic surfactants. Non-ionic surfactants used in the cellular solid material according to the present invention, as well as in the method for its manufacturing, may have a hydrophilic-lipophilic balance (HLB) value of at least 8, at least 9, at least 10, at least 11, at least 12, at least 13, at least 14, at least 15, or at least 16. Preferably, the non-ionic surfactant has an HLB in the range from 10 to 20. Examples of non-ionic surfactants in the solid cellular material according to the present invention are selected from the group consisting of polysorbate 20 (Tween 20), polysorbate 80 (Tween 80), triton X-100, sorbitan monolaurate (span 20), polyvinylalcohol 70 kDa (PVOH), and poly(ethylene glycol)-block-poly(propylene glycol)-block-poly(ethylene glycol) (e.g. P123), or a combination thereof. Preferably, the non-ionic surfactant according to the present invention is at least a non-ionic surfactant selected from the group consisting of polysorbate 20 (Tween 20), polysorbate 80 (Tween 80), triton X-100, sorbitan monolaurate (span 20), and polyvinylalcohol 70 kDa (PVOH). Specifically, the cellular solid material according to the present invention may comprise the non-ionic surfactant Tween 20.

In certain embodiments the cellular solid material according to the present invention comprises one or more anionic surfactants. In a specific embodiment of the present invention the cellular solid material comprises only surfactants selected from anionic surfactants. Anionic surfactants generally have a much higher HLB value than non-ionic surfactants due to the higher hydrophilicity of the anionic group. The HLB-value for anionic surfactants cannot be calculated with Griffin's equation above, but can be determined experimentally by trying to emulsify liquids of required HLB value.

Suitable anionic surfactants in the cellular solid material according to the present invention, as well as in the method for its manufacturing, are those which have a hydrophilic-lipophilic balance (HLB) value of at least 18, at least 20, at least 22, at least 24, at least 26, at least 28, at least 30, at least 35, or at least 40. Examples of suitable anionic surfactants are anionic surfactants selected from the group consisting of sodium dodecyl sulfate (SDS), sodium lauryl ether sulfate (SLES), sodium oleate, and potassium oleate, or a combination thereof. Specifically, the cellular solid material according to the present invention may comprise the anionic surfactant sodium dodecyl sulfate (SDS).

The cellular solid material according to the present invention may also comprise a combination of anionic and non-ionic surfactants, such as in detergents and washing-up liquids.

Thus, the present invention enables a cellular solid material, as well as a method for its manufacture, comprising CNF and one or more surfactants, wherein the surfactants are surfactants selected from the group consisting of anionic and non-ionic surfactants, or a combination of thereof, wherein the cellular solid material has a density of less than 500 kg/m$^3$; and at least 50% of the cells of the material have a diameter of at least 10 µm.

Further, the cellular solid material according to the present invention may be provided in a thickness of at least 0.05 mm, at least 0.1 mm, at least 0.2 mm, at least 0.5 mm, at least 1 mm, at least 2 mm, at least 5 mm, or at least 10 mm. The cellular solid material may be provided in a thickness up to and including 500 cm, 100 cm, or up to and including 50 cm.

Unlike cationic surfactants, anionic and non-ionic surfactants do not adsorb to anionic CNF and will therefore not make the CNF surface active. Therefore it was not expected that with a method according to the present invention an aqueous dispersion of anionic CNF and anionic or non-ionic surfactants, or anionic CNF and a combination of anionic and non-ionic surfactants, could be formed into wet foams so stable that they could be dried into a cellular solid material with maintained porous structure, without using freeze-drying, supercritical drying or cationic surfactants.

Surprisingly, wet foams prepared from a CNF-dispersion of at least 0.2 wt % CNF, in combination with an anionic surfactant, such as SDS, or a non-ionic surfactant, such as Tween 20, can be dried with maintained cellular structure, without using freeze-drying or supercritical drying, to achieve a cellular solid material according to the present invention.

The cellular solid material according to the present invention may comprise less than 40 wt %, or less than 30 wt % surfactant, as calculated on the total weight of cellular solid material. The solid cellular material according to the present invention may comprise at least 0.2 wt %, or at least 0.5 wt % surfactant.

After addition of the surfactant in step (a) of the method according to the present invention, the pH of the obtained mixture may be adjusted to pH 4.5 and above, such as pH 5 and above, pH 6 and above, pH 7 and above, pH 8 and above, or pH 9 and above. The pH of the mixture in step (a) may be up to and including pH 12, up to and including pH 11, or up to and including pH 10.

The density of the wet foam obtained as an intermediate in step (c) according to the method of the present invention is less than 98%, less than 90%, less than 80%, less than 70%, less than 60%, less than 50%, less than 40%, less than 30%, less than 20% of the mixture prepared in (b). The amount of gas possible to introduce in the foaming step (b) will have an influence on the lowest possible density of the obtained wet foam. The amount of gas possible to introduce will depend on the method for introducing the gas, the viscosity of the CNF dispersion and the type and amount of surfactant. The density of the wet foam obtained as an intermediate in step (c) according to the method of the present invention is at least 1%, at least 5%, at least 10%, at least 15%, at least 20%, or at least 25% of the mixture prepared in (b).

The foaming in step c) of the method may be performed by introducing a gas into the mixture obtained in step (b). The gas may be introduced by mixing; such as beating, agitation, and whipping; bubbling or any other means suitable for formation of foam.

Thus, the foaming may be performed by mixing the mixture comprising CNF and the surfactant in the presence of a gas. Alternatively, the foaming may be performed by blowing a gas or adding a foaming agent into the mixture.

Figure 3:
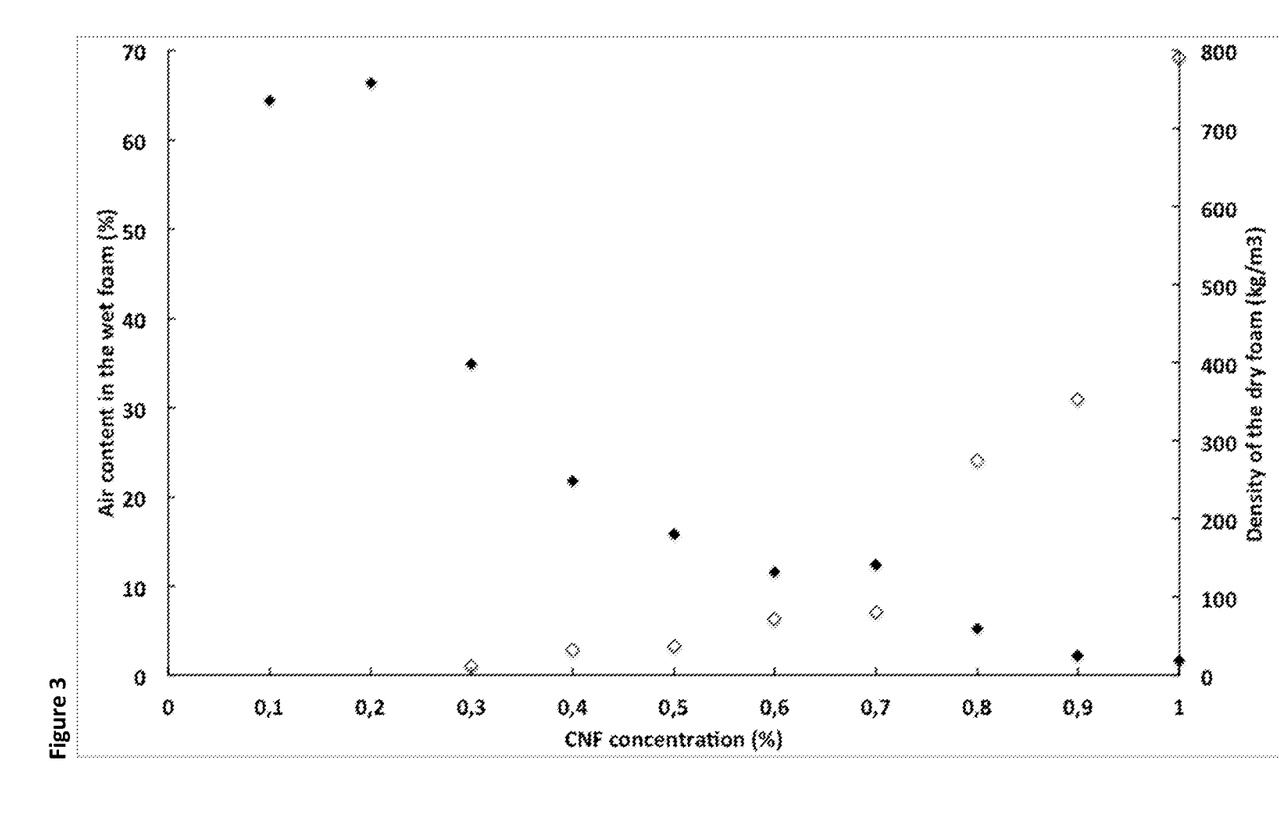
FIG. 3 shows the air content (♦) in the wet foam and the density (◊) of the cellular solid material as a function of the CNF dispersion concentration, wherein the SDS load was kept constant at 0.1 ml SDS solution (20 g/L) in 30 ml of CNF dispersion.
Figure 4:
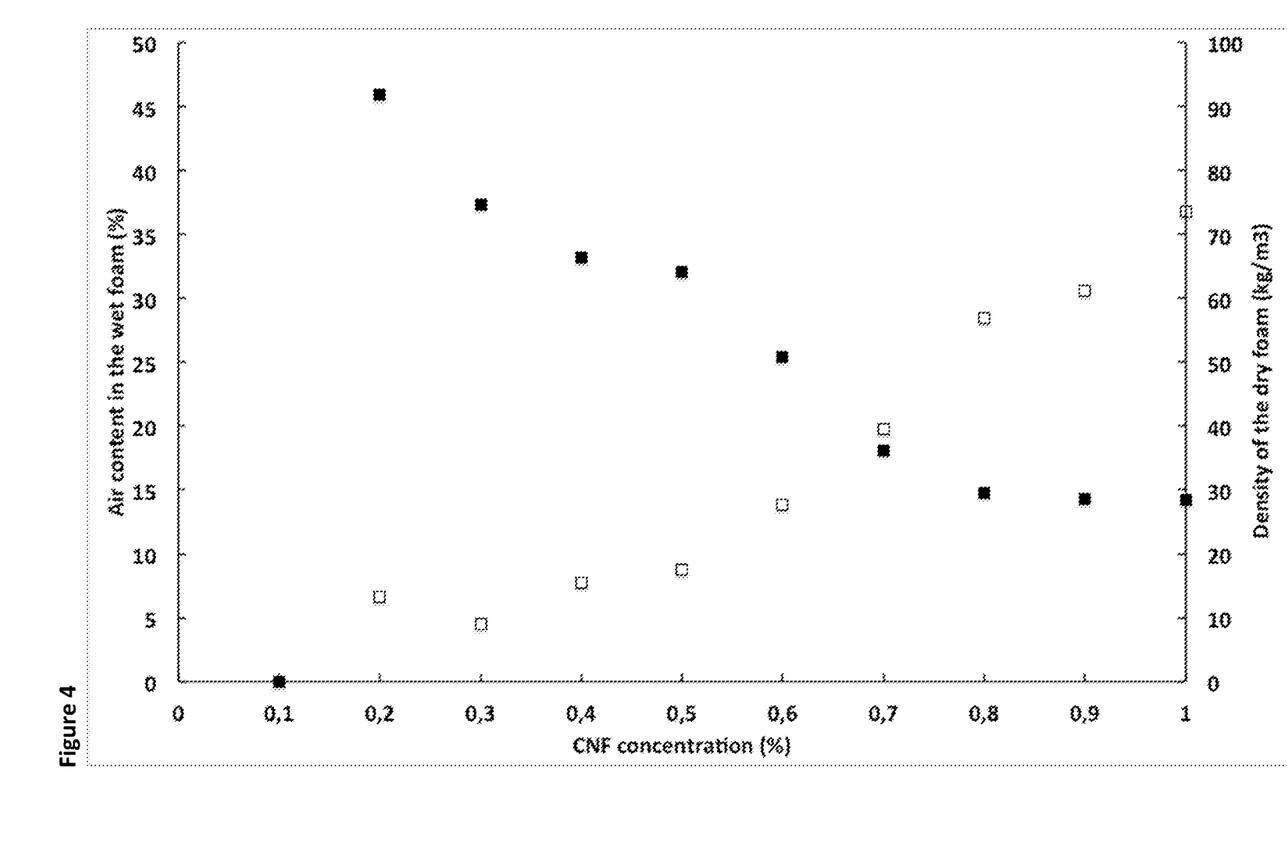
FIG. 4 shows the air content (♦) in the wet foam and the density (◊) of the cellular solid material as a function of the CNF dispersion concentration, wherein the SDS load was 20 mg SDS/g CNF.

The gas content of the wet foam may decrease with increasing CNF concentration for a given method for introducing gas into the mixture, as is shown in FIGS. 3 and 4. At the same time the density of the cellular solid material may increase when the CNF concentration is increased and/or less gas is introduced into the mixture.

The wet foam obtained in (c) of the present method is stable for a period long enough to allow it to be dried without collapsing and largely maintaining the cellular structure of the wet foam. An advantage is that the wet foam obtained in step (c) of the method of the present invention may be transferred to another location before it is dried, such as to a solid surface or to a mold, while mainly maintaining the cellular structure of the wet foam.

The porosity, φ, of the cellular solid material is calculated by using equation [2], where ρ is the density of the cellular solid material according to the present invention and $\rho_{cellulose}$ is the density of dry solid cellulose.

$$\phi = 1 - \frac{\rho}{\rho_{cellulose}} \quad [2]$$

The drying of the wet foam in step (d) of the method of the present invention may be performed at a temperature of 5-95° C., 5-80° C., 10-70° C., 10-60° C., 10-50° C., 20-50° C., or 35-45° C.; or by subjecting the wet foam to a temperature of 5-95° C., 5-80° C., 10-70° C., 10-60° C., 10-50° C., 20-50° C., or 35-45° C.; until it reaches a liquid content of less than 98 wt %, or less than 90 wt %, less than 80 wt %, less than 70 wt %, less than 60 wt %, or even less than 50 wt % of the total weight of the wet foam, and then raising the temperature to a temperature above the boiling point of the aqueous solvent used for dispersing the CNF in step (a). The liquid content of the cellular solid material after drying may be 0 wt %, or at least 5 wt %, at least 10 wt %, at least 20 wt %, at least 30 wt %, or at least 40 wt %. The drying of the foam in step (d) may be performed at a pressure of 5-1000 kPa, 10-500 kPa, 20-400 kPa, 30-300 kPa, 40-200 kPa or preferably 50-150 kPa. Thus, resource intensive methods for drying the wet foam, such as supercritical extraction and freeze-drying, can be avoided. Drying performed at the temperatures and pressures according to the present invention has the advantage that the cellular solid material is less prone to cracking, especially when large components and sheets are formed. The porous structure may thus be maintained also when the foam has been dried.

The drying of the wet foam might result in a decrease in volume. The decrease is mainly due to the volume of water evaporating from the foam.

The method may further comprise the step of forming the wet foam in step (c) to a sheet prior to drying. Preferably, the foam is formed into a sheet having a thickness of at least 0.1 mm, or at least 0.5 mm, at least 1 mm, at least 5 mm, at least 10 mm, or at least 20 mm prior to drying. The formed sheet may have a thickness of at least 0.05 mm after drying, or at least 0.1 mm, or at least 0.2 mm, or at least 0.5 mm, or at least 1 mm, or at least 2 mm, or at least 5 mm, or at least 10 mm. The options available for drying and removal of the liquid content from the wet foam, such as size of the production equipment and the time available for production of the cellular solid material, influences the maximum material thickness available. Typically, the cellular solid material may be provided in a thickness up to and including 500 cm, up to and including 100 cm, or up to and including 50 cm.

The cellular solid material according to the present invention has a density of less than 500 kg/m$^3$, less than 300 kg/m³, less than 200 kg/m³, less than 100 kg/m³, or less than 50 kg/m³. The density of the cellulose solid material may be at least 0.5 kg/m³, or at least 1.0 kg/m³.

In the cellular solid material according to the present invention, at least 50% of the cells of the material has a diameter of at least 10 µm. Preferably, the cellular solid material according to the present invention, at least 50% of the cells of the material has a diameter of at least 50 µm, at least 100 µm, at least 150 µm, at least 200 µm, at least 250 µm, at least 300 µm, at least 400 µm, at least 500 µm, at least 750 µm, or at least 1000 µm.

An object or substance's resistance to being deformed elastically may be characterized by the Young's modulus. Young's modulus E in compression is defined as the ratio of the stress (force per unit area) along an axis to the compression strain (ratio of deformation over initial length) along that axis in the range of stress in which Hooke's law holds, i.e. in the initial linear portion of the compression stress-strain curve, and is calculated by equation [3].

$$E = \frac{F/A_0}{\Delta L/L_0} \qquad [3]$$

E is the Young's modulus; F is the force exerted on an object under compression; $A_0$ is the original cross-sectional area through which the force is applied; $\Delta L$ is the amount by which the length of the object changes; $L_0$ is the original length of the object.

For the purpose of the present invention, the Young's modulus given herein is measured in the direction vertical to the surface of sheets of the cellular solid material that have been dried on a planar surface prior to measuring. The specific modulus as used herein is calculated as the Young's modulus divided by the density of the sample.

The cellular solid material of the present invention may have a specific modulus of at least 1 kPa/(kg/m³), at least 5 kPa/(kg/m³), at least 10 kPa/(kg/m³), at least 15 kPa/(kg/m³), at least 20 kPa/(kg/m³), at least 25 kPa/(kg/m³), or at least 30 kPa/(kg/m³). The cellular solid material of the present invention may have a specific modulus of up to and including 100 kPa/(kg/m³), or even up to and including 150 kPa/(kg/m³).

The cellular solid material according to the present invention may be cross-linked, such as by adding $CaCO_3$ and gluconolactone to the dispersion. Alternatively, the cellular solid material according to the present invention may be obtained without using cross-linking agents.

The cellular solid material according to the present invention may further comprise one or more additives, such as additives selected from the group consisting of plasticizers, such as glycerol, xylitol, sorbitol, maltitol, sucrose, glucose, fructose, xylose, polyethylene glycol, propylene glycol, butanediol, glycerine, and urea; inorganic or organic nanoparticles, such as silica nanoparticles, and carbon nanotubes; clay, such as sodium-montmorillonite, kaolinite, chlorite and mica; cellulose nanocrystals; and polymers, including but not limited to hemicelluloses, lignin, lignosulfonates, cellulose derivatives, starch, other biopolymers, and synthetic polymers.

Notwithstanding the above, the cellular solid material according to the present invention may comprise essentially no fibrous material in addition to CNF. Further, the wet foam obtained in step (c) of the method according to the present invention may comprise no fibrous material in addition to CNF.

Preferably, the cellular solid material according to the present invention may comprise only anionic cellulose nanofibers and at least one anionic or non-ionic surfactant and optionally a gas or an aqueous liquid, and essentially no other components, such as plasticizers, crosslinking agents, inorganic or organic nanoparticles, clay, cellulose nanocrystals, or polymers.

Thus, the cellular solid material according to the present invention may be obtained without adding additives such as plasticizers, crosslinking agents, inorganic or organic nanoparticles, clay, cellulose nanocrystals, or polymers, in the method for its manufacturing.

The cellular solid material according to the invention may absorb liquids without losing its cellular structure.

Another aspect of the present invention is the use of a cellular solid material according to the present invention as at least one material selected from the group consisting of insulation materials; packaging materials; absorption materials and construction materials. Examples of insulation materials wherein a cellular solid material according to the present invention can be used are building insulation, acoustic insulation, thermal insulation and electrical insulation. Examples of absorption materials are liquid absorption, for example for use in diapers and wound dressing; energy absorption (e.g. shock absorption); and acoustic absorption materials. Examples of the use as construction material is as a light weight structural component in building constructions, in sandwich panels, flotation devices, and in furniture, for example as upholstery and padding.

A yet further aspect of the present invention is products comprising a cellular solid material according to the present invention. Examples of such products includes slabs; sheets; layers, such as layers in laminates; and molded structures.

Slabs, sheets and layers formed of the cellular solid material according to the present invention may have a thickness of at least 0.05 mm after drying, or at least 0.1 mm, or at least 0.2 mm, or at least 0.5 mm, or at least 1 mm, or at least 2 mm, or at least 5 mm, or at least 10 mm. The slabs, sheets and layers may have a thickness up to and including 500 cm, up to and including 100 cm, or up to and including 50 cm.

EXAMPLES

The cellular solid material according to the present invention and comparative example are illustrated in the following examples.

Materials

Cellulose Nanofibers (CNF).

Different grades of cellulose nanofibers (CNF) were used to prepare cellular solid materials. The different grades are described below.

Enzymatic CNF (Enz-CNF) was prepared from pulp fibers that were subjected to an enzymatic pre-treatment and thereafter defibrillated in a high-pressure homogenizer, similar to a previously described method (Henriksson et al. 2007).

TEMPO-CNF was prepared from a commercial sulfite softwood-dissolving pulp (Domsjö Dissolving Pulp; Domsjö Fabriker AB, Domsjö, Sweden), with a hemicellulose content of 4.5% and a lignin content of 0.6%. The never-dried dissolving pulp fibers were oxidized using TEMPO according to a previously described method (Saito et al. 2007). The fibers were suspended in water containing TEMPO and NaBr. The TEMPO-mediated oxidation of the cellulose fibers was started by addition of NaClO, and pH 10 was kept by continuous addition of NaOH. When no NaOH consumption was needed to keep pH 10, the pH was adjusted to pH 5 with HCl. Thereafter the TEMPO oxidized fibers were filtrated and washed rigorously with deionized water. The TEMPO-oxidized fibers were diluted to desired concentration, typically 1%, and were defibrillated in a domestic blender (Magrini, Vita-Prep 3, 1200W) until a viscous dispersion of CNF was formed. By adding different amounts of NaClO the charge of the TEMPO-CNF could be controlled. The TEMPO-CNF charge was varied between 284-1472 µeq/g, as measured by polyelectrolyte titration (Wågberg L., et al., Nord. Pulp Pap. Res. J. 1989, 4, 71-76).

Carboxymethylated CNF was prepared at Innventia AB, Stockholm, Sweden, with the aid of a high-pressure homogenization technique using a carboxymethylation pretreatment of the fibers. The never-dried fibers were first dispersed in deionized water at 10 000 revolutions in an ordinary laboratory reslusher. The fibers were then solvent-changed to ethanol by washing the fibers in ethanol four times with intermediate filtration and impregnated for 30 min with a solution of 10 g of monochloroacetic acid in 500 ml of isopropanol. These fibers were added in portions to a solution of NaOH, methanol and isopropanol that had been heated to just below its boiling point, and the carboxymethylation reaction was allowed to continue for one hour. Following the carboxymethylation step, the fibers were filtered and washed in three steps: first with deionized water, then with acetic acid (0.1 M) and finally with deionized water again. The fibers were then impregnated with a NaHCO$_3$ solution (4 wt % solution) for 60 min in order to convert the carboxyl groups to their sodium form. Finally, the fibers were washed with deionized water and drained on a Büchner funnel. After this treatment, the fibers were passed through a high-pressure homogenizer (Microfluidizer M-110EH, Microfluidics Corp). The homogenizer was equipped with two chambers of different sizes connected in series (200 and 100 µm). Homogenization was achieved with a single pass at a fiber consistency of 2 wt % in aqueous solution and the charge density of the fibers was 647 µeq/g as determined by conductometric titration (Katz S., et al, Svensk Papperstidning, 1984, R87).

2,2,6,6-tetramethylpiperidine-1-oxyl (TEMPO) was purchased from Fluorochem Ltd (Hadfield, UK). Sodium hypochlorite (NaClO) was purchased from Applichem GmbH (Darmstadt, Germany). NaBr and NaOH was purchased from Sigma-Aldrich (Munich, Germany) and HCl was purchased from Th. Geyer GmbH (Renningen, Germany). Glycerol and sodium dodecyl sulfate (SDS) was purchased from Applichem GmbH (Darmstadt, Germany). Polyoxyethylene (20) sorbitan monolaurate (Tween 20), polyoxyethylene (20) sorbitan monooleate (Tween 80), sorbitan monolaurate (Span 20) and 1-octylamine was purchased from Alfa Aesar GmbH (Karlsruhe, Germany). Triton X-100, sorbitan monooleate (Span 80), potassium oleate and polyvinylalcohol 72 kDa (PVOH) was purchased from Sigma-Aldrich (Munich, Germany). Sodium oleate was purchased from Carl Roth GmbH (Karlsruhe, Germany). Sodium lauryl ether sulfate (SLES) was purchased from Th. Geyer (Segeltorp, Sweden). Yes was obtained from Procter & Gamble (Cincinnati, USA).

Xyloglucan (XG) with a molecular weight of 50 kDa (XG50k), obtained form *Tamarindus Indica* and prepared by enzymatic digestion of native xyloglucan using cellulase from *Trichoderma reesei*. Sodium montmorillonite (Cloisite Na$^+$, cation exchange capacity 92 mequiv/100 g) was obtained from Andreas Jennow A/S (Birkerød, Denmark).

The sodium montmorillonite (MTM) was allowed to swell in water for 24 h and was thereafter dispersed by vigorous stirring before use.

Characterization

Wet Foam Stability.

The wet foam stability was evaluated as the foam volume, V, at time t divided by the original foam volume, $V_0$, at t=0.

Pendant Drop.

The drop/bubble profile tensiometry (DPT) is a well-established technique for determining the mechanical properties of liquid-gas interface. The technique is based on that the geometry of a pendant drop can be related to the surface tension of the investigated liquid. Gravity strives to elongate the drop whereas the surface tension strives to keep the drop spherical. In the DPT equipment a drop of liquid is suspended from the end of a tube by surface tension, the shape of the drop is constantly monitored by a computer that registers the form as a function of area variation as the drop is oscillated by a sinusoidal change in drop volume. When surfactants are present in the liquid they are able to adsorb and desorb at the liquid-gas interface during the oscillation. Depending on the frequency of the oscillation, and the adsorption kinetics of the surfactant, the surface tension will change in a sinusoidal manner which is out of phase with the oscillation of the surface area. A fast-adsorbing surfactant, measured at a low frequency, will show only a relatively small amplitude in the surface tension variation. However, when large molecules or small particles are adsorbed at the interface, they do not have the same tendency to desorb from the interface, due to the high adsorption energy/particle, and the drop shape will in this case reflect the rheological properties of the gas-liquid interface.

The complex elastic properties determined with this procedure can be described according to equation [4]. From this relationship it is obvious that the modulus E at the liquid-gas interface is composed of an elastic part ($E_0$) and a viscoelastic part ($2\pi v\eta$) and will therefore be frequency dependent and the frequency of the oscillating drop should not be higher than the requirement of mechanical equilibrium of the interface. The pendant drop experiments are performed by subjecting a dropletgas to 10 oscillations under ambient conditions and repeating this measurement every 10 minutes in the course of one hour. All experiments have been conducted at a concentration of 1 g/L.

$$E = \frac{\Delta\gamma}{\frac{\Delta A}{A_0}} = E_0 + i2\pi v\eta \quad [4]$$

where γ is the interfacial tension, A is the area at a given time and $A_0$ is the area at time=0, $\Delta\gamma=\gamma(t)-\gamma^0$, $\Delta A/A_0=(A(t)-A_0)/A_0$, $E_0$=dilational surface elasticity, ν=is the perturbation frequency and η=dilational surface viscosity.

An increased elastic modulus of the liquid-gas interface indicates that the CNF particles have adsorbed at the liquid-gas interface, and a high elastic modulus is considered to be beneficial for preparing stable wet foams.

Compression Testing.

Prepared cellular solid materials were cut into 1 cm square test pieces with heights between 0.4 and 1.5 cm. Compression tests were performed with an Instron 5566 universal testing machine in a conditioned room at 23° C. and 50% relative humidity. The samples were conditioned at 23° C. and 50% relative humidity for 24 hours before being tested according to ISO 844:2007(E). A 500 N load cell was used with a compression rate of 10% of the original sample thickness per min. The final strain was chosen to 80% of the original specimen height to be able to evaluate the material behaviour over a large deformation interval. The energy absorbed by the foam was taken as the area below the stress-strain curve between 0% and 80% strain for all samples. The specific modulus was calculated as the Young's modulus in compression, E, divided by the density of the sample using the equation [5].

$$E/\rho = \frac{F/A_0}{\Delta L/L_0} \Big/ \rho \qquad [5]$$

E is the Young's modulus in compression; $\rho$ is the density (in mass per volume) of the test piece of the cellular solid material, F is the force exerted on the test piece under tension; $A_0$ is the original cross-sectional area through which the force is applied; $\Delta L$ is the amount by which the height of the test piece changes; $L_0$ is the original height of the test piece.

The Young's modulus was measured in the vertical drying direction.

Cellular Solid Density and Porosity.

The porosity of the cellular solid materials was calculated according to equation [2], where $\rho$ is the density of the cellular solid material and $\rho_{cellulose}$ (1.57 g/cm$^3$) is the density of dry solid cellulose.

$$\phi = 1 - \frac{\rho}{\rho_{cellulose}} \qquad [2]$$

The porous structure of the cellular solid materials was evaluated by scanning electron microscopy (SEM) using a TM-1000 TableTop SEM (Hitachi, Tokyo, Japan). The pore size was measured manually in the SEM images.

COMPARATIVE EXAMPLES

Wet Foam Stability.

TEMPO-oxidized anionic CNF (0.1 wt %) was foamed with octylamine, Tween 20 and SDS respectively. The amount of added octylamine, Tween 20 and SDS corresponded to ⅓ of the total CNF charges. The foam was created by hand shaking resulting in drained foam on top of a water column.

Figure 1:
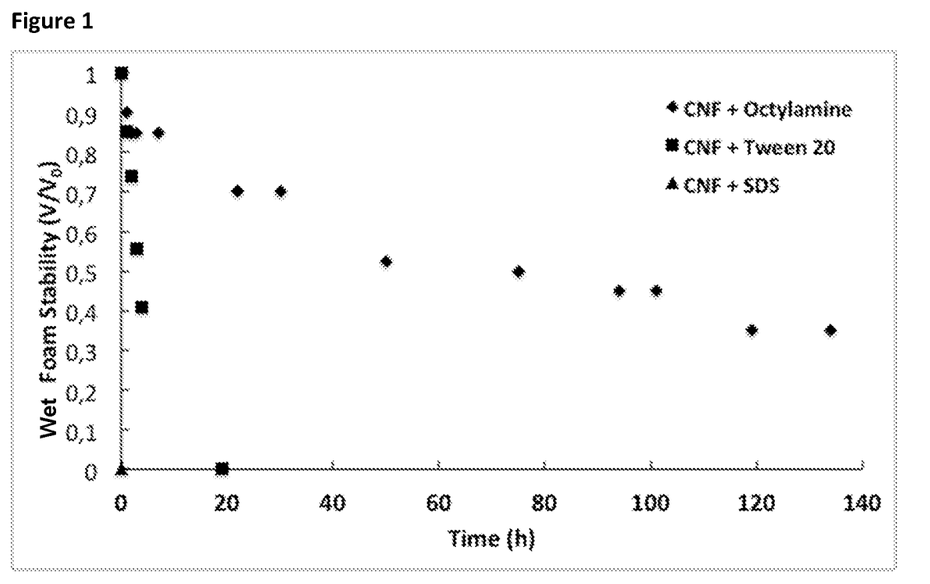
FIG. 1 shows the wet foam stability of CNF foams made with different surfactants.

The wet foam stability was evaluated as the foam volume, V, at time t divided by the original foam volume, $V_0$, at t=0, see FIG. 1. When octylamine was used the wet foam was relatively stable over a long period of time after a small initial drop in foam volume, see FIG. 1. This indicates that the octylamine has lyophobized the CNF and made it surface active and that the foam is particle-stabilized, with modified CNF adsorbed at the gas/liquid interface. In contrast, when Tween 20 was used the wet foam was entirely collapsed after 20 h and already after 5 h the foam volume was only 40% of $V_0$. For SDS the collapse was even faster and already after less than one hour the wet foam was totally collapsed. This indicates that Tween 20 and SDS do not adsorb to the CNF and do not make the CNF surface active. From this experiments it seems impossible using Tween 20 and SDS to create a particle-stabilized foam in the sense that the CNF is surface active and adsorbs to the gas/liquid interface.

Pendant Drop.

Figure 2:
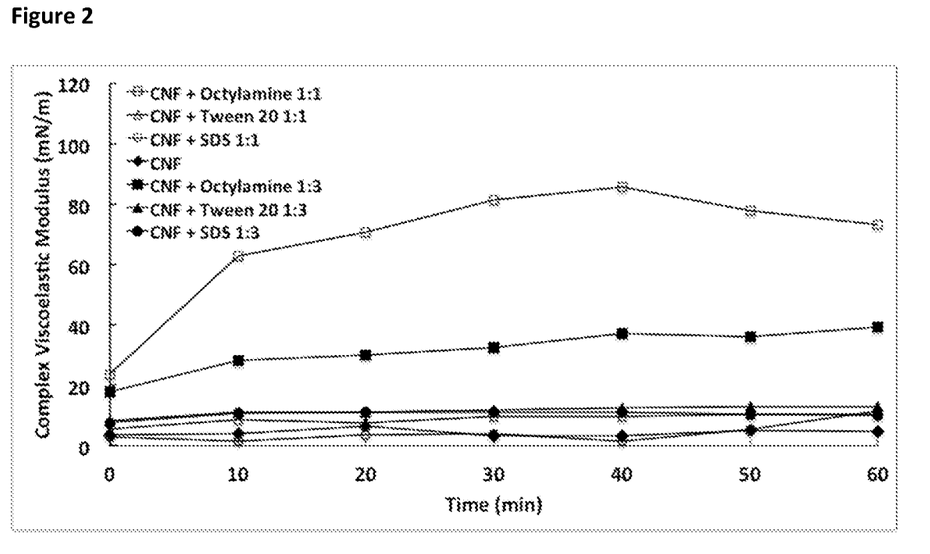
FIG. 2 shows the complex elastic modulus for CNF with and without added surfactant.

FIG. 2 presents the complex elastic modulus, as determined by drop/bubble profile tensiometry, for CNF without added surfactant (diamonds) and in mixtures with octylamine (squares), SDS (circles) and Tween 20 (triangles) respectively. Closed symbols indicate that the amount of surfactant (mol) corresponded to ⅓ of the total amount of CNF charges. Open symbols indicate that the amount of surfactant (mol) corresponded to 1/1 of the total amount of CNF charges. FIG. 2 shows that the elastic modulus is much higher for mixtures comprising CNF in combination with octylamine than for CNF in combination with SDS and Tween 20. SDS and Tween20 does not change the elastic modulus significantly as compared to CNF without added surfactant. This indicates that SDS and Tween20 does not adsorb to the CNF and also that the CNF is not surface active, and further that it should not be possible to prepare stable CNF foams using SDS and Tween 20.

Examples 1-18

The features of the cellular solid materials according to the present invention are further illustrated in the following examples.

Examples 1-8 illustrates that different surfactants, CNF raw materials, additives and preparation conditions can be used to prepare cellular solid materials comprising CNF and non-ionic or anionic surfactants.

Examples 9-16 illustrates a range of properties of cellular solid CNF materials that can be obtained by some specific combinations of CNF, surfactants and additives. According to the literature, supported by the wet foam stability and pendant drop measurements, these wet foams of anionic CNF in combination with different anionic and non-ionic surfactants were not expected to be stable enough to dry with maintained porous structure. However, the following examples show that they were.

Examples 17-20 illustrates the effects of different surfactant concentrations and different foaming, drying and forming setups on the properties of the cellular solid material Example 1

Different types of surfactants were used to prepare cellular solid CNF materials with maintained porous structure. 30 g of TEMPO-oxidized anionic CNF (0.5 wt %, surface charge 983 µeq/g) was combined with different anionic and non-ionic surfactants, see Table 1. The different combinations were mixed, adjusted to pH 8, and foamed for 5-10 minutes using a laboratory mechanical stirrer at 2000 rpm and a small impeller (diameter=3 cm). The resulting wet foams were poured into plastic trays and were dried in a fan oven at 40° C. Table 1 shows that a wide variety of anionic, and non-ionic surfactants can be used to prepare cellular solid CNF materials with maintained porous structure. These examples were not optimized in terms of amount of surfactant, density, pore size, thickness or mechanical properties.

TABLE 1

Cellular solid CNF materials comprising different surfactants.

| Surfactant | HLB | Amount of surfactant (wt %)* | Density of the cellular solid (kg/m$^3$) |
|---|---|---|---|
| Anionic: | | | |
| Sodium Dodecyl Sulfate (SDS) | 40 | 2.6 | 17 |

TABLE 1-continued

Cellular solid CNF materials comprising different surfactants.

| Surfactant | HLB | Amount of surfactant (wt %)* | Density of the cellular solid (kg/m³) |
|---|---|---|---|
| Sodium Lauryl Ether Sulfate (SLES) | | 1.3 | 68 |
| Sodium Oleate | 20 | 0.7 | 63 |
| Potassium Oleate | 18 | 1.6 | 15 |
| Non-ionic: | | | |
| Polysorbate 20 (Tween 20) | 16.7 | 10 | 15 |
| Polysorbate 80 (Tween 80) | 15 | 25 | 16 |
| Triton X-100 | 13.5 | 5.1 | 14 |
| Sorbitan monolaurate (Span 20) | 8.6 | 12 | 127 |
| Sorbitan monooleate (Span 80) | 4.3 | 51 | 539 |
| Polyvinylalcohol 70 kDa (PVOH) | | 40 | 21 |
| Blends: | | | |
| Yes ® (commercial detergent blend) | | 12 | 47 |

*Calculated on the total weight of the solid cellular material

TABLE 2

CNF cellular solid material comprising different additives.

| Sample | Additive | CNF solids content before foaming (wt %) | Surfactant | Amount of additive in the cellular solid (wt %) | Density of the cellular solid (kg/m³) |
|---|---|---|---|---|---|
| I | Glycerol | 0.6 | SDS | 26.5 | 13.2 |
| II | Xyloglucan 50 kDa | 0.5 | Tween 20 | 50 | 26.3 |
| III | Sodium Montmorillonite Clay (MTM) | 0.6 | Tween 20 | 33 | 18.9 |
| IV | Polyvinylalcohol 72 kDa (PVOH) | 0.5 | PVOH | 40 | 21 |

Example 2

Different additives can be used in the preparation of dry cellular solid CNF materials with maintained porous structure, see table 2. Sample I: 30 g of TEMPO-oxidized anionic CNF dispersion (0.6 wt %), 0.065 g of glycerol and 0.1 ml of anionic SDS (25 g/L) was mixed, adjusted to pH 8, and foamed for 5 minutes using a laboratory mechanical stirrer at 2000 rpm and a small impeller (diameter=3 cm). The resulting wet foam was poured into a plastic tray and was dried in a fan oven at 40° C. Sample II: 75 g of TEMPO-oxidized anionic CNF dispersion (0.6 wt %), 0.22 g of sodium montmorillonite clay (MTM) and 1.5 ml of non-ionic Tween 20 (100 g/L) was mixed, adjusted to pH 8, and foamed for 5 minutes using a laboratory mechanical stirrer at 2000 rpm and a small impeller (diameter=3 cm). The resulting wet foam was poured into a plastic tray and was dried at room temperature. Sample III: 300 g of TEMPO-oxidized anionic CNF dispersion (0.5 wt %), 1.5 g XG50k and 2.0 ml of non-ionic Tween 20 (100 g/L) was mixed, adjusted to pH 8, and foamed for 5 minutes using a laboratory mechanical stirrer at 2000 rpm and a large impeller (diameter=4.5 cm). The resulting wet foam was poured into a plastic tray and was dried in a fan oven at 40° C. Sample IV: 30 g of TEMPO-oxidized anionic CNF dispersion (0.5 wt %), and 2 ml of non-ionic PVOH (50 g/L) was mixed, adjusted to pH 8, and foamed for 5 minutes using a laboratory mechanical stirrer at 2000 rpm and a small impeller (diameter=3 cm). The resulting wet foam was poured into a plastic tray and was dried in a fan oven at 40° C.

Table 2 shows that a variety of additives such as plasticizers, inorganic nanoparticles and polymers can be included in the preparation of dry cellular solid CNF materials with maintained porous structure. These examples were not optimized in terms of amount of surfactant, amount of additive, density, pore size, thickness or mechanical properties.

Example 3

Air content and density of cellular solid material. To 30 g of TEMPO-oxidized anionic CNF dispersion (surface charge 983 µeq/g) at different CNF concentrations, 0.1%-1.0%, was added SDS solution (20 g/L) and the combined fluids were mixed, adjusted to pH 8, and foamed for 5-10 minutes using a laboratory mechanical stirrer at 2000 rpm and a small impeller (diameter=3 cm). The resulting wet foams were poured into plastic trays and were dried in a fan oven at 40° C.

In a first set of experiments, the SDS load was kept constant at 0.1 ml SDS solution (20 g/L) in 30 g of CNF dispersions with different CNF concentrations. FIG. 3 shows the air content in these wet foams (closed diamonds) and density of the cellular solid materials (open diamonds) as a function of the CNF dispersion concentration during foaming. For the lowest CNF concentrations, 0.1 wt % and 0.2 wt %, the air content in the wet foams was high. These foams were however not stable enough but collapsed upon drying. The air content decreased with increasing CNF concentration, probably due to the increase in viscosity of the CNF at higher concentrations, which with the mixing setup used in these experiments made it more difficult to introduce air with increasing CNF concentration. With decreasing air content in the wet foams, the density of the dry cellular solid materials increased with increasing CNF concentration. The density was very high at the highest concentrations peaking at almost 800 kg/m³ for 1 wt % CNF concentration. For a given mixing setup and a given SDS load per volume of CNF dispersion the air content in the wet foams decreases and the density of the dry cellular solid materials increases with increasing CNF concentration during foaming.

In a second set of experiments, the SDS load was kept constant at 20 mg of SDS per gram of dry CNF, i.e. the higher the CNF concentration the higher the absolute SDS load. FIG. 4 shows the air content in the wet foam (closed squares) and density of the dry cellular solid material (open squares) as a function of the CNF dispersion concentration during foaming. For the lowest CNF concentration, 0.1 wt % CNF, the foam was so unstable that it collapsed even before the air content could be measured and consequently no cellular solid material could be obtained. From 0.2 wt % to 1 wt % CNF concentration the trend was the same as in FIG. 3, the air content in the wet foams decreased and the density of the dry cellular solid materials increased with increasing CNF concentration during foaming. However, because the SDS load at higher CNF concentrations was higher than in FIG. 3 the decrease in air content and the increase in density was not as dramatic in FIG. 4. At 1 wt % CNF concentration the air content in the wet foam was still 14 wt % and the density of the dry cellular solid material was 74 kg/m³ as compared to 2 wt % air and 791 kg/m³ at 1 wt % CNF concentration in FIG. 3.

Example 4

30 g of CNF dispersion, of different grade and charge density, was combined with SDS (20 g/L), see table 3. The different combinations were mixed, adjusted to pH 8, and foamed for 5-10 minutes using a laboratory mechanical stirrer at 2000 rpm and a small impeller (diameter=3 cm). The resulting wet foams were poured into plastic trays and were dried in a fan oven at 40° C.

Table 3 shows that a wide variety of CNF with different properties can be used to prepare cellular solid CNF materials.

TABLE 3

| Raw material | CNF solids content before foaming (wt %) | Amount of SDS solution (ml) | Density of the cellular solid (kg/m³) |
| --- | --- | --- | --- |
| Carb. Meth. CNF 647 µeq/g | 1 | 0.2 | 103 |
| TEMPO-CNF 284 µeq/g | 1.1 | 0.025 | 242 |
| TEMPO-CNF 823 µeq/g | 1 | 0.04 | 56 |
| TEMPO-CNF 983 µeq/g | 0.9 | 0.27 | 61 |
| TEMPO-CNF 1472 µeq/g | 0.9 | 0.04 | 32 |

Example 5

30 g of TEMPO-CNF dispersion (0.97 wt %) was combined with 0.26 ml of SDS (25 g/L), mixed and adjusted to pH 4.7, and foamed for 5-10 minutes using a laboratory mechanical stirrer at 2000 rpm and a small impeller (diameter=3 cm). The resulting wet foam was poured into a plastic tray and was dried in a fan oven at 40° C. The density of the dry cellular solid material was 88 kg/m³.

Example 6

30 g of TEMPO-CNF dispersion (0.97 wt %) was combined with 0.26 ml of SDS (25 g/L), mixed and adjusted to pH 6.25, and foamed for 5-10 minutes using a laboratory mechanical stirrer at 2000 rpm and a small impeller (diameter=3 cm). The resulting wet foam was poured into a plastic tray and was dried in a fan oven at 40° C. The density of the dry cellular solid material was 85 kg/m³.

Example 7

40 g of Enz-CNF dispersion (3 wt %) was combined with potassium oleate (0.6 mL, 25 g/L) and Tween 20 (1 mL, 25 g/L) respectively. The different combinations were mixed, adjusted to pH 9, and foamed for 5-10 minutes using a laboratory mechanical stirrer at 2000 rpm and a small impeller (diameter=3 cm). The resulting wet foams were poured into plastic trays and were dried in a fan oven at 40° C. The density was 275 kg/m³ for both dry cellular solid materials, made with potassium oleate and Tween 20 respectively, corresponding to a porosity of 82.5%. The dry foams had a cellular structure with cells originating from the air bubbles in the wet foam. The porous structure was maintained throughout the drying of the foam.

Example 8

Enz-CNF dispersion (3 wt %) was combined with TEMPO-CNF dispersion at different ratios, and optionally de-ionized water was added, see table 4. 0.4 mL of sodium oleate (25 g/L) was added to each combination. The different combinations were mixed, adjusted to pH 9, and foamed for 5-10 minutes using a laboratory mechanical stirrer at 2000 rpm and a small impeller (diameter=3 cm). The resulting wet foams were poured into plastic trays and were dried in a fan oven at 40° C. The dry foams had a cellular structure with cells originating from the air bubbles in the wet foam. The porous structure was maintained throughout the drying of the foam. Table 4 shows the range of densities of the cellular solid materials that was obtained by combining Enz-CNF and TEMPO-CNF at different ratios.

TABLE 4

| Enz-CNF 3 wt % (g) | TEMPO-CNF 1 wt % (g) | H₂O (g) | Density of the cellular solid (kg/m³) |
| --- | --- | --- | --- |
| 20 | 15 | 5 | 110 |
| 20 | 20 | — | 175 |
| 30 | 10 | — | 210 |

Example 9

Preparation of a Cellular Solid Material with P123 and CaCO₃ and a Comparative Example without CaCO₃.

6.49 g of TEMPO-oxidized CNF dispersion with a charge density of 900 µeq/g and a concentration of 0.77 wt % were mixed with 1.373 mL of Milli-Q water. The mixture was homogenized with an IKA T25 digital ULTRA-TURRAX for 3 min at 7000 rpm and 1.138 mL of nonionic surfactant P123 (34.8 g/L) (HLB=7-9) was added and mixed for 15 minutes using magnetic stirring. In a subsequent step, 800 µL of calcium carbonate suspension (0.0625 M) was added under magnetic stirring for 5 minutes. The resulting mixture with a total volume of 10 cm³ and a concentration of TEMPO-CNF of 0.5 wt % was foamed using the IKA T25 digital ULTRA-TURRAX during drop-wise addition of 200 µL of gluconolactone solution (0.5 M). The wet foam was covered with a perforated aluminum film and dried in an oven at 60° C. for 24 hours. After that the foam was removed from the beaker, flipped over and placed back in a beaker. Then the drying process was continuing for 6 more hours. The volumes of the obtained wet foam and dry cellular solid material were 21.7 and 11 cm³, respectively. The cellular solid material had a density of about 8 kg/m³ and was characterized by a cellular structure with round shaped cells, which are representing the air bubbles entrapped within the matrix in a wet state. The size of the cells was typically in the hundreds of µm range.

In a comparative example, wet CNF foams were also prepared using P123 but without the addition of CaCO₃ and gluconolactone. Foams prepared and dried without CaCO₃ and gluconolactone following the procedure described above collapsed completely during drying. Reducing the drying temperature to 50° C. and less resulted in a significant shrinkage and the final volume of the obtained solid material was 2 cm³ or less.

Example 10

30 g of TEMPO-oxidized anionic CNF dispersion (0.6 wt %) and 0.1 ml of anionic SDS (25 g/L) was mixed, adjusted to pH 8, and foamed for 5 minutes using a laboratory mechanical stirrer at 2000 rpm and a small impeller (diameter=3 cm). The resulting wet foam was poured into a plastic tray and was dried in a fan oven at 40° C. The density of the dry cellular solid material was 9.3 kg/m$^3$ corresponding to a porosity of 99.4%. An SEM image of the cellular solid material can be seen in FIG. 5. The cellular solid material has a cellular structure with cells originating from the air bubbles in the wet foam. It is clear that the porous structure has been maintained throughout the drying of the foam. The size of the cells is typically in the hundreds of μm range and most cells are smaller than 500 μm. The Young's modulus in compression of the cellular solid material was 138 kPa, which gives a specific modulus of 14.8 kPa/(kg/m$^3$) and the energy absorption at 70% compression was 33 kJ/m$^3$. The cellular solid material did not collapse entirely, even though it was compressed by 80%, but regained a large part of its original height after the compression load was removed.

Example 11

300 g of TEMPO-oxidized anionic CNF dispersion (0.5 wt %) and 1.0 ml of anionic SDS (25 g/L) was mixed, adjusted to pH 8, and foamed for 5 minutes using a laboratory mechanical stirrer at 2000 rpm and a large impeller (diameter=4.5 cm). The resulting wet foam was poured into a plastic tray and was dried in a fan oven at 40° C. The density of the dry cellular solid material was 7.5 kg/m$^3$ corresponding to a porosity of 99.5%. An SEM image of the cellular solid material can be seen in FIG. 6. The cellular solid material has a cellular structure with cells originating from the air bubbles in the wet foam. It is clear that the porous structure has been maintained throughout the drying of the foam. The size of the cells is typically larger than for the foam in Example 6 with most of the cells larger than 500 μm and close to 1 mm. The mixing was done with a larger impeller than in Example 6, which might have affected the size of the bubbles. The pore size of the dry cellular solid material can thus be tailored by choosing different impellers or by introducing air into the wet foam by other means. The Young's modulus in compression of the cellular solid material was 281 kPa, which gives a specific modulus of 37.5 kPa/(kg/m$^3$) and the energy absorption at 70% compression was 18 kJ/m$^3$. The foam collapsed when compressed and did not regain any part of its original height after the compression load was removed. This different behavior from example 6 might be partly due to the difference in pore size and this emphasizes that the properties of the cellular solid materials can be tailored by using different foaming techniques.

Example 12

45 g of TEMPO-oxidized anionic CNF dispersion (0.6 wt %) and 1.5 ml of anionic SDS (25 g/L) was mixed, adjusted to pH 8, and foamed for 5 minutes using a laboratory mechanical stirrer at 2000 rpm and a small impeller (diameter=3 cm). The resulting wet foam was poured into a plastic tray and was dried in a fan oven at 40° C. The density of the dry cellular solid material was very low, 4.4 kg/m$^3$ corresponding to a porosity of 99.7%. The Young's modulus in compression was 52 kPa, which gives a specific modulus of 11.8 kPa/(kg/m$^3$) and the energy absorption at 70% compression was 3 kJ/m$^3$.

Example 13

30 g of TEMPO-oxidized anionic CNF dispersion (0.6 wt %) and 0.8 ml of non-ionic Tween20 (25 g/L) was mixed, adjusted to pH 8, and foamed for 5 minutes using a laboratory mechanical stirrer at 2000 rpm and a small impeller (diameter=3 cm). The resulting wet foam was poured into a plastic tray and was dried in a fan oven at 40° C. The density of the dry cellular solid material was 15.4 kg/m$^3$ corresponding to a porosity of 99.0%. The cellular solid material had a cellular structure with cells originating from the air bubbles in the wet foam. The porous structure of the wet foam had been maintained throughout the drying of the foam. The cell size was typically in the hundreds of micrometer range. The Young's modulus in compression was 301 kPa, which gives a specific modulus of 19.5 kPa/(kg/m$^3$) and the energy absorption at 70% compression was 50 kJ/m$^3$. The cellular solid material did not collapse entirely, even though it was compressed by 80%, but regained a large part of its original height after the compression load was removed.

Example 14

30 g of TEMPO-oxidized anionic CNF dispersion (0.6 wt %), 0.065 g of glycerol and 0.1 ml of anionic SDS (25 g/L) was mixed, adjusted to pH 8, and foamed for 5 minutes using a laboratory mechanical stirrer at 2000 rpm and a small impeller (diameter=3 cm). The resulting wet foam was poured into a plastic tray and was dried in a fan oven at 40° C. The density of the dry cellular solid was 13.2 kg/m$^3$ corresponding to a porosity of 99.2%. The Young's modulus in compression was 81 kPa, which gives a specific modulus of 6.1 kPa/(kg/m$^3$) and the energy absorption at 70% compression was 32 kJ/m$^3$. The addition of glycerol made the sample more flexible.

Example 15

75 g of TEMPO-oxidized anionic CNF dispersion (0.6 wt %), 0.22 g of sodium montmorillonite clay (MTM) and 1.5 ml of non-ionic Tween 20 (100 g/L) was mixed, adjusted to pH 8, and foamed for 5 minutes using a laboratory mechanical stirrer at 2000 rpm and a small impeller (diameter=3 cm). The resulting wet foam was poured into a plastic tray and was dried at room temperature. The density of the dry cellular solid material was 18.9 kg/m$^3$ corresponding to a porosity of 98.8%. The Young's modulus in compression was 237 kPa, which gives a specific modulus of 12.5 kPa/(kg/m$^3$) and the energy absorption at 70% compression was 29 kJ/m$^3$. Addition of MTM might improve the fire retardancy of the foam.

Example 16

300 g of TEMPO-oxidized anionic CNF dispersion (0.5 wt %), 1.5 g XG50k and 2.0 ml of non-ionic Tween 20 (100 g/L) was mixed, adjusted to pH 8, and foamed for 5 minutes using a laboratory mechanical stirrer at 2000 rpm and a large impeller (diameter=4.5 cm). The resulting wet foam was poured into a plastic tray and was dried in a fan oven at 40° C. The density of the dry cellular solid material was 26.3 kg/m$^3$ corresponding to a porosity of 98.3%. The Young's modulus in compression was 895 kPa, which gives a specific modulus of 34.0 kPa/(kg/m$^3$) and the energy absorption at 70% compression was 39 kJ/m$^3$.

Example 17

The surfactant concentration is varied at constant CNF concentration and at a fix foaming setup. The effect of surfactant concentration on the wet foam properties and on the cellular solid properties, such as density, pore structure and Young's modulus is evaluated.

Example 18

The foaming setup is varied at constant CNF concentration and constant surfactant concentration. The effect of different foaming setups on the air content in the wet foam and on the properties of the cellular solid material, such as density, pore structure and Young's modulus is evaluated.

Example 19

The effect of different drying setups and different drying temperatures on the properties of the cellular solid materials are evaluated.

Example 20

Cellular solid materials comprising CNF and anionic or non-ionic surfactants are prepared in different shapes, such as sheets of different thickness and cellular solid materials dried in molds to obtain more complex shapes.

The invention claimed is:

1. A cellular solid material comprising cellulose nanofibers (CNF) and a surfactant, wherein:
   a) the surfactant comprises a non-ionic surfactant;
   b) the material has a density of less than 500 kg/m$^3$; and
   c) at least 50% of the cells of the material have a diameter of at least 10 p.m.

2. The cellular solid material according to claim 1, wherein the cellulose nanofibers are anionic cellulose nanofibers.

3. The cellular solid material according to claim 1, wherein the surfactant is non-ionic.

4. The cellular solid material according to claim 3, wherein the non-ionic surfactant is selected from the group consisting of polysorbate 20, polysorbate 80, triton X-100, sorbitan monolaurate, poly(ethylene glycol)-block-poly(propylene glycol)-block-poly(ethylene glycol), and polyvinylalcohol 70 kDa, and a combination thereof.

5. The cellular solid material according to claim 1, wherein the cellular solid material comprises less than 40 wt % of the surfactant, as calculated on the total weight of the cellular solid material.

6. The cellular solid material according to claim 1, wherein the CNF has a charge density of from 0 to 2000 μeq/g.

7. The cellular solid material according to claim 1, wherein the CNF is any one of enzymatic CNF, TEMPO-oxidized CNF or carboxymethylated CNF, or a combination thereof.

8. The cellular solid material according to claim 1, wherein at least 50% of the cells of the material have a diameter of at least 200 μm.

9. The cellular solid material according to claim 1, wherein the material has a specific modulus of at least 1 kPa/(kg/m$^3$).

10. The cellular solid material according to claim 1, wherein the material further comprises essentially no fibrous material in addition to CNF.

11. The cellular solid material according to claim 1, wherein the material further comprises essentially no cross-linking agents.

12. A sheet comprising the cellular solid material of claim 1 and having a thickness of at least 0.05 mm.

13. A product selected from insulation, packaging material and an absorption material, comprising the cellular solid material of claim 1.

14. The cellular solid material of claim 1, wherein the cellular solid material comprises a single type of surfactant.

15. The cellular solid material of claim 1, wherein the cellular solid material comprises at least 50 wt % CNF.

16. The cellular solid material of claim 1, wherein the cellular solid material comprises at least 60 wt % CNF.

17. A method for manufacturing a dried cellular solid material with a density of less than 500 kg/m$^3$, comprising the steps of:
   a) providing a dispersion comprising cellulose nanofibers (CNF) in an aqueous solvent,
   b) adding a surfactant comprising a non-ionic surfactant to the dispersion in (a) to obtain a mixture;
   c) preparing a wet foam from the mixture obtained in (b), wherein the wet foam has a density less than 98% of the mixture prepared in (b); and
   d) drying the wet foam obtained in (c) to obtain a cellular solid material, wherein at least 50% of the cells of the material have a diameter of at least 10 μm.

18. The method according to claim 17, wherein the wet foam obtained in step c) comprises no fibrous material in addition to CNF.

19. The method according to claim 17, wherein the surfactant is non-ionic.

20. The method according to claim 19, wherein the non-ionic surfactant is selected from the group consisting of polysorbate 20, polysorbate 80, triton X-100, sorbitan monolaurate, poly(ethylene glycol)-block-poly(propylene glycol)-block- poly(ethylene glycol), and polyvinylalcohol 70 kDa, and a combination thereof.

21. The method according to claim 17, wherein the concentration of CNF in the dispersion obtained in step a) is at least 0.2 wt % of the total weight of said dispersion.

22. The method according to claim 17, wherein the CNF has a charge density of from 0 to 2000 μeq/g.

23. The method according to claim 17, wherein the CNF is TEMPO-oxidized any one of enzymatic CNF, TEMPO-oxidized CNF or carboxymethylated CNF, or a combination thereof.

24. The method according to claim 17, wherein the method further comprises the step of forming the foam to a sheet having thickness of at least 0.1 mm prior to drying.

25. The method according to claim 17, wherein the solvent has a water content of at least 80%.

26. The method according to claim 17, wherein the solvent is water.

27. The method according to claim 26, wherein the foam is formed by mixing the mixture in the presence of a gas, or by blowing a gas into the mixture.

28. The method according to claim 26, wherein the gas is air.

29. The method according to claim 17, wherein the preparation of a foam in (c) is made by introducing a gas into the mixture obtained in (b).

30. The method according to claim 17, wherein the drying is performed at a temperature of 5-95° C.

31. The method according to claim 17, wherein the drying is performed at a pressure of 5-1000 kPa.

32. The method according to claim 17, wherein the drying is performed without freeze-drying or supercritical drying.

33. The method according to claim 17, wherein the obtained dried cellular material is a sheet.

\* \* \* \* \*

UNITED STATES PATENT AND TRADEMARK OFFICE
CERTIFICATE OF CORRECTION

PATENT NO. : 11,091,877 B2
APPLICATION NO. : 15/523045
DATED : August 17, 2021
INVENTOR(S) : Erik Johansson et al.

It is certified that error appears in the above-identified patent and that said Letters Patent is hereby corrected as shown below:

On the Title Page

Column 2, Line 3 item (56) (Other Publications), please delete "Biomacromalecules," and insert -- Biomacromolecules, --, therefor.

In the Claims

Column 21, Line 31, in Claim 1, please delete "p.m." and insert -- µm. --, therefor.

Signed and Sealed this
Twenty-third Day of August, 2022

*Katherine Kelly Vidal*

Katherine Kelly Vidal
*Director of the United States Patent and Trademark Office*